(12) United States Patent
Hellmich et al.

(10) Patent No.: US 9,404,304 B2
(45) Date of Patent: Aug. 2, 2016

(54) METHOD FOR OPERATING A FLAP ARRANGEMENT OF A MOTOR VEHICLE

(75) Inventors: Dirk Hellmich, Duisburg (DE); Juergen Eggeling, Muelheim an der Ruhr (DE); Klaus Duenne, Ratingen (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 14/006,598

(22) PCT Filed: Mar. 16, 2012

(86) PCT No.: PCT/EP2012/001196
§ 371 (c)(1),
(2), (4) Date: Feb. 10, 2014

(87) PCT Pub. No.: WO2012/175150
PCT Pub. Date: Dec. 27, 2012

(65) Prior Publication Data
US 2014/0188349 A1  Jul. 3, 2014

(30) Foreign Application Priority Data
Jun. 20, 2011  (DE) .......................... 10 2011 105 460

(51) Int. Cl.
*B60R 22/00* (2006.01)
*E05F 15/00* (2015.01)
(Continued)

(52) U.S. Cl.
CPC ............. *E05F 15/2076* (2013.01); *B60R 25/24* (2013.01); *E05F 15/70* (2015.01); *E05F 15/77* (2015.01); *E05Y 2900/546* (2013.01)

(58) Field of Classification Search
CPC ...... B60R 25/24; E05F 15/20; E05F 15/2076; E05Y 2900/546

USPC ............................................................. 701/49
See application file for complete search history.

(56) References Cited

U.S. PATENT DOCUMENTS

2012/0267914 A1* 10/2012 Thiele .................. B60J 5/06
                                                          296/146.9

FOREIGN PATENT DOCUMENTS

DE       10341691       3/2005
DE    2020050200085     6/2007
(Continued)

OTHER PUBLICATIONS

International Search Report from International Application No. PCT/EP2012/001196, corresponding to this U.S. Appl. No. 14/006,598, mailed Aug. 6, 2012, 3 pages.

*Primary Examiner* — Maceeh Anwari
(74) *Attorney, Agent, or Firm* — Pauly, Devries Smith & Deffner

(57) ABSTRACT

The invention relates to a method for operating a flap arrangement of a motor vehicle, wherein the flap arrangement has a flap wing and a control arrangement, wherein a flap drive which is assigned to the flap wing and by which the flap wing can be adjusted between a closed position and an open position in an adjustment process is provided, wherein at least one predetermined flap operator control event is detected by means of the control arrangement and the flap drive is actuated as a technical control reaction to a flap operator control event. It is proposed that by means of the control arrangement the technical control reaction of stopping or continuing an adjustment process, which is due to two successive flap operator control events, is suppressed if at least one suppression condition is detected.

18 Claims, 1 Drawing Sheet

(51) Int. Cl.
*G05D 1/00* (2006.01)
*G05D 3/00* (2006.01)
*G06F 17/00* (2006.01)
*G06F 7/70* (2006.01)
*E05F 15/20* (2006.01)
*B60R 25/24* (2013.01)
*E05F 15/70* (2015.01)
*E05F 15/77* (2015.01)

(56) References Cited

FOREIGN PATENT DOCUMENTS

| | | | |
|---|---|---|---|
| DE | 102008032732 | | 1/2010 |
| DE | 102008032733 | * | 1/2010 |
| WO | 2010046008 | | 4/2010 |

* cited by examiner

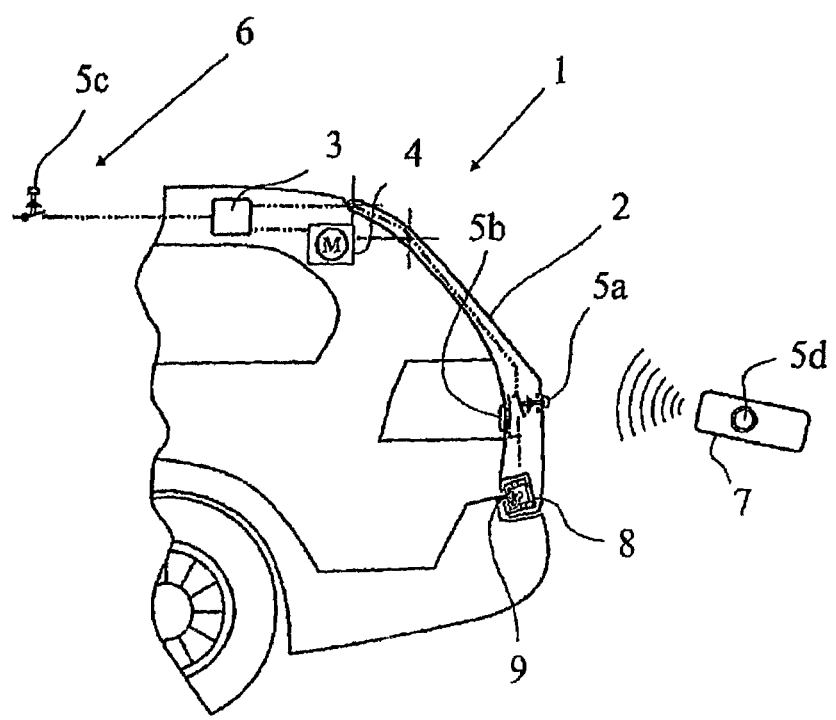

METHOD FOR OPERATING A FLAP ARRANGEMENT OF A MOTOR VEHICLE

CROSS-REFERENCE TO RELATED APPLICATIONS

This application is a national stage application under 35 U.S.C. 317 of Inter-national Patent Application Serial No. PCT/EP2012/001196, entitled "Verfahren für den Betrieb einer Klappenanordnung eines Kraftfahrzeugs" filed Mar. 16, 2012, which claims priority from German Patent Application No. 10 2011 105 460.3, filed Jun. 20, 2011, the disclosures of which are hereby incorporated by reference herein in their entirety.

FIELD OF THE INVENTION

The present invention relates to a method for operating a flap arrangement of a motor vehicle and to a flap arrangement of a motor vehicle.

BACKGROUND

The method in question relates to the motor-operated adjustment processes, in particular the opening process and the closing process, for a flap wing of a motor vehicle. The term "flap wing" is to be understood comprehensively here. It includes tailgates, rear lids, engine hoods, doors, in particular side doors, load compartment floors, or the like, of a motor vehicle.

A known flap arrangement of a motor vehicle (DE 20 2005 020 085 U1) is provided with a flap wing, a motor vehicle lock and a control arrangement, wherein the motor vehicle lock is provided with the customary lock elements of a lock catch and a pawl. The known flap arrangement is also provided with a motor-operated flap drive with which a motor-operated opening process and a motor-operated closing process can be carried out.

When a motor-operated adjustment process is triggered on the user side it is generally the case that a predetermined flap operator control event is detected by means of the control arrangement and the flap drive is actuated as a technical control reaction to a flap operator control event. The flap operator control event is in the simplest case the user-side activation of an activation element such as a pushbutton key.

In the known method for operating a flap arrangement ("BMW operating instructions for the vehicle limousine/touring, 520i-530d", page 42, BMW AG, Munich, 2001, order No. 01400156203) it is assumed that an upper activation element is arranged on the flap wing. In particular, an activation element is arranged on the outside of the flap, an activation element is arranged on the inside of the flap and an activation element is arranged in the passenger compartment of the vehicle in the region of the driver's seat. The motor-operated flap adjustment can therefore be triggered by a total of three operator control events which correspond to the user-side activation of the respective activation element.

The activation elements operate in the known method in a so-called "toggle operating mode". This means that when the flap wing is located in the closed position or the open position, the activation element firstly starts an activation of an opening process or closing process. A second activation during the adjustment process then triggers the stopping of the adjustment process. A third activation of the activation element finally causes the adjustment process to be continued in the opposite adjustment direction. With continuous activation it is therefore possible to trigger a continuous reversal of direction, wherein every second flap operator control event, that is to say every second activation, triggers the stopping of the adjustment process.

With the known method it is possible to bring about the motor-operated flap adjustment with few activation elements and at the same time in a user-friendly fashion. Undesired effects arise as a result of the fact that in many cases two or more successive flap operator control events occur inadvertently. This may be the case, for example, if an opening movement process is triggered by the activation of the activation element which is arranged on the outside of the flap wing. The opening process is usually preceded by the flap wing jumping up slightly, which is due to the fact that the motor vehicle lock opens and the counterpressure of the flap seal acts in a pulse-like fashion on the flap wing. This jump can lead to a situation in which the user inadvertently carries out a further undesired activation. This further activation triggers undesired stopping of the adjustment process as a result of the toggle operating mode mentioned above, and this is perceived by the user as a loss of convenience.

The invention is based on the problem of configuring and developing the known method for the operation of a flap arrangement in such a way that the convenience of use is improved.

SUMMARY

The above problem is achieved with a method according to the following.

What is significant is the basic idea that in the case of two successive flap operator control events the technical control reaction of stopping an adjustment process, which is due to the second flap operator control event, is suppressed by means of the control arrangement if at least one predetermined suppression condition is detected.

Given a suitable configuration, the above-mentioned undesired reaction of stopping the adjustment process with simple technical control means can be largely avoided. The omission of the undesired stopping of an adjustment process provides considerable improvement of the user's convenience.

If a plurality of suppression conditions are defined, they can be linked as an AND logic operation in the control arrangement. This means that all the suppression conditions have to be met to bring about suppression of the respective reaction as proposed. Numerous variants are possible for the suppression conditions.

An embodiment relates to the problems of multiple activation of the same activation element, as mentioned in the introductory part of the description. If the second flap operator control event is due to activation of another activation element, for example because a risk of trapping has been detected from the passenger compartment of the vehicle, the respective reaction is not suppressed.

In the case of the further embodiments, the respective reaction is suppressed exclusively in a predetermined time interval or in a predetermined adjustment range of the flap wing. This allows for the fact that the undesired double activation, which is to be avoided by the proposed solution, primarily occurs in a limited range around the closed position of the flap wing. Correspondingly, according to an embodiment it is also provided there that the respective reaction is suppressed exclusively in the course of the opening process.

According to further an additional embodiment, a flap arrangement has a flap wing, a control arrangement and a flap drive. What is significant here is the fact that the control arrangement is configured, in particular programmed, to be able to carry out the proposed method. Reference can be made to the statements relating to the above.

In an embodiment the invention provides a method for operating a flap arrangement of a motor vehicle, wherein the flap arrangement has a flap wing and a control arrangement, wherein a flap drive which is assigned to the flap wing and by which the flap wing can be adjusted between a closed position and an open position in an adjustment process is provided, wherein at least one predetermined flap operator control event is detected by means of the control arrangement and the flap drive is actuated as a technical control reaction to a flap operator control event, and wherein, by means of the control arrangement, a new adjustment process is started from a stationary state as a technical control reaction to a flap operator control event or a stopped adjustment process is, under certain circumstances, continued in the opposite adjustment direction and the adjustment process is stopped during an adjustment process, wherein in the case of two successive flap operator control events the technical control reaction of stopping an adjustment process, which is due to the second flap operator control event, is suppressed by means of the control arrangement if at least one suppression condition is detected.

In an embodiment, at least two suppression conditions are defined which have to be met for the suppression of a technical control reaction in the manner of an AND logic operation.

In an embodiment, a flap operator control event is assigned an activation element, the activation of which corresponds to the respective flap operator control event.

In an embodiment, at least one activation element which is assigned to a flap operator control event is arranged on the flap wing, and/or in that an activation element which is assigned to a flap operator control event is arranged in the passenger compartment of the vehicle, and/or in that an activation element which is assigned to a flap operator control event is arranged on a radio key or the like.

In an embodiment, a suppression condition is that the successive flap operator control events are substantially identical flap operator control events.

In an embodiment, a suppression condition is that the successive flap operator control events are successive within a predetermined limiting time interval In an embodiment, a suppression condition is that the flap wing is in a predetermined adjustment range In an embodiment, suppression condition is that the first flap operator control event of the successive flap operator control events triggers the starting of an opening process.

In an embodiment, a flap wing and a control arrangement are provided, wherein a flap drive which is assigned to the flap wing and by which the flap wing can be adjusted between a closed position and an open position in an adjustment process is provided, and wherein the control arrangement starts, as a technical control reaction to a flap operator control event, a new adjustment process from a stationary state or, under certain circumstances, continues a stopped adjustment process in the opposite adjustment direction, and stops the adjustment process during an adjustment process, wherein the control arrangement suppresses the technical control reaction of the stopping of an adjustment process, which is due to two successive flap operator control events, if the control arrangement detects at least one suppression condition.

In an embodiment, the flap arrangement has a motor vehicle lock which in a latched state engages in a securing fashion with a closing wedge or the like, and in a released state releases the closing wedge or the like, and in that the motor vehicle lock is adjusted to the released state by means of the control arrangement before a motor-operated opening process is started.

In an embodiment, the identical flap operator control events are assigned an activation element.

In an embodiment, an activation element arranged on the flap wing.

In an embodiment, an activation element arranged on the outside of the flap wing.

In an embodiment, the limiting time interval is less than 3 seconds.

In an embodiment, the limiting time interval is less than 1 second.

In an embodiment, the limiting time interval is less than 0.5 seconds.

In an embodiment, the flap wing is in a predetermined limiting adjustment range positioned before the closed position.

In an embodiment, the limiting adjustment range is defined by an adjustment travel of the flap wing, in particular a flap angle, by an adjustment travel of the flap drive or by an adjustment portion in relation to the respective overall adjustment travel.

BRIEF DESCRIPTION OF THE DRAWINGS

In the text which follows, the invention is presented on the basis of a drawing illustrating merely one exemplary embodiment.

FIG. 1 shows the rear region of a motor vehicle with a proposed flap arrangement for carrying out a method as proposed.

DETAILED DESCRIPTION

The flap arrangement 1 which is illustrated in the drawing is provided in the usual fashion with a flap wing 2 and with a control arrangement 3. All the components of the flap arrangement 1 are illustrated in a highly schematic fashion in the drawing.

The control arrangement 3 can be coupled to a superordinate controller, on the one hand, and to the component, to be actuated, of the flap arrangement 1, on the other, via a bus system, in particular via a CAN bus system. The control arrangement 3 can, as shown in FIG. 1, have a self-contained structure or else be distributed in a decentralized fashion.

The flap wing 2 is the tailgate of a motor vehicle. The term "flap wing" is, however, to be interpreted widely, as indicated above, and comprises, inter alia, rear lids, engine hoods, doors, in particular side doors, load compartment floors or the like of a motor vehicle.

The flap wing 2 is assigned a flap drive 4 by which the flap wing 2 can be adjusted in a known fashion between the closed position and an open position (illustrated in the drawing) in an adjustment process.

For the user-side triggering of an adjustment process there is provision that the control arrangement 3 is configured to detect at least one predetermined flap operator control event. The flap operator control event may be any user-side activation, as will be explained below.

If the control arrangement 3 has a predetermined flap operator control event as above, it correspondingly actuates the flap drive 4 as a technical control reaction to this flap operator control event.

If a flap operator control event from a stationary state of the flap wing 2 is detected, there are two actuation possibilities. If the flap wing 2 is in one of the two end positions, a new adjustment process, specifically an opening process or a closing process, is started. If the flap arrangement 1 is in a mechanical or technical control intermediate state in which an adjustment process which has been started has been stopped previously, the control arrangement 3 will continue the stopped adjustment process. In an embodiment, the adjustment process is then continued in the opposite adjustment direction. If a flap operator control event is detected during an ongoing adjustment process, the control arrangement stops the adjustment process. Up until this point, the method for operating a flap arrangement corresponds to the "toggle method" explained in the introductory part of the description.

What is essential here is that in the case of two successive flap operator control events the technical control reaction of stopping an adjustment process, which is due to the second flap operator control event, is suppressed by means of the control arrangement 3 if at least one suppression condition is detected.

It is basically conceivable that after the proposed suppression of a technical control reaction the customary flap operation 4 is continued. However, it is also conceivable that the suppression is continued for a predetermined time interval.

In the general part of the description it has already been mentioned that a plurality of suppression conditions can be defined. In this case, it is also the case that for a technical control reaction to be suppressed all the suppression conditions have to be met in the manner of an AND logic operation. It is therefore not sufficient if just one of the suppression conditions is met.

A flap operator control event is assigned an activation element 5, the activation of which corresponds to the respective flap operator control event. The activation element 5 is an electrical pushbutton key or the like.

It can be seen in the drawing that at least one activation element 5*a, b* which is assigned to a flap operator control event is arranged on the flap wing 2. Here an activation element 5*a* is arranged on the outside of the flap wing 2 and an activation element 5*b* on the inside of the flap wing 2. A further activation element 5*c* which is assigned to a flap operator control event, and which is arranged in the passenger compartment 6 of the vehicle, is indicated in the drawing. Finally, a fourth activation element 5*d*, assigned to a flap operator control event, is arranged on a radio key 7. There are therefore a total of four activation elements 5 provided, each of which is assigned a flap operator control event as mentioned above. The flap operator control events here are the pressing of the respective electrical pushbutton key. Each of these flap operator control events leads to a technical control reaction of the control arrangement 3, as described above.

It is to be expected that the proposed solution is relevant, in particular, with regard to the avoidance of an undesired double activation of the same activation element 5*a-d*. Correspondingly, one suppression condition is that the above successive flap operator control events are substantially identical flap operator control events. The user therefore inadvertently performs the same flap operator control event.

The identical flap operator control events are assigned one activation element 5*a*. This activation element 5*a* is the activation element 5*a* arranged on the outside of the flap wing 2 here.

The risk of an undesired double activation usually occurs only at the start of an adjustment process, in particular at the start of the opening process. Correspondingly, a suppression condition can be that the successive flap operator control events follow one another within a predetermined limiting time interval. This limiting time interval can be less than 3 s, further less than is and in particular less than 0.5 s. The configuration depends here substantially on the structural conditions.

It is correspondingly also conceivable that the respective reaction is suppressed only in a predetermined adjustment range of the flap wing 2. In particular, a suppression condition is that the flap wing 2 is in a predetermined adjustment range which is a limiting adjustment range positioned before the closed position. This adjustment range can be defined, for example, by an adjustment travel of the flap wing 2, and by a predetermined flap angle or by a predetermined adjustment time here. However, it is also conceivable that the adjustment range is defined by an adjustment travel of the flap drive 4, for example by the adjustment travel of a drive shaft or transmission shaft of the flap drive 4. The interrogation of the adjustment of such a shaft can be carried out, for example, by an incremental Hall sensor or the like.

However, it is basically also conceivable that the limiting adjustment range is defined by an adjustment portion in relation to the respective overall adjustment travel. For example, the limiting adjustment range can be defined by a percentage of a total adjustment travel of the flap wing 2 or any other element in the respective drive train.

As explained in the introductory part of the description, the aim is primarily to avoid undesired double activation when the opening process starts. Correspondingly, a suppression condition is that the first flap operator control event of the two successive flap operator control events triggers the starting of an opening process.

According to further teaching, which is also accorded independent significance, the above flap arrangement 1 of a motor vehicle is claimed as such. The basic design of the flap arrangement arises from the explanations relating to the proposed method, with the result that reference can be made to the statements there. It is significant here that the flap arrangement 1 serves to carry out the above proposed method.

In one embodiment, the flap arrangement 1 is provided with a motor vehicle lock 8 which in a latched state engages in a securing fashion with a closing wedge 9 or the like, and in a released state releases the closing wedge 9 or the like. The motor vehicle lock 8 is adjusted to the released state by means of the control arrangement 3 before a motor-operated opening process is started. When the flap wing 2 is located in the closed position, the motor vehicle lock 8 is correspondingly in the latched state, which has to be overcome during the starting of the opening process, as explained above.

The opening process generally causes the flap wing 2 to jump up briefly, as has been explained in the introductory part of the description. The proposed solution makes it readily possible to avoid a situation in which the jumping up of the flap wing 2 entails undesirable double activation of the activation element 5*a* arranged on the outside of the flap wing 2.

The invention claimed is:
1. A method for operating a flap arrangement of a motor vehicle, the flap arrangement comprising a flap wing, a control arrangement, and a flap drive assigned to the flap wing, the flap drive configured to adjust the flap wing between a closed position and an open position, the method comprising:
  detecting a first flap operator control event with the control arrangement;
  actuating the flap drive as a technical control reaction to the detecting of the first flap operator control event as part of an adjustment process;
  detecting a second flap operator control event successive to the first flap operator control event;
  determining if a suppression condition is detected; and suppressing, if the suppression condition is detected, a technical control reaction of stopping the adjustment process due to the detecting of the second flap operator control event.

2. The method as claimed in claim 1, wherein determining if the suppression condition is detected comprises determining if at least two suppression conditions are detected, and wherein each of the at least two suppression conditions have to be met before suppressing the stopping of the adjustment process.

3. The method as claimed in claim 1, wherein a flap operator control event is assigned an activation element, the activation of which corresponds to the respective flap operator control event.

4. The method as claimed in claim 1, wherein at least one activation element which is assigned to a flap operator control event is arranged on the flap wing, and/or in that an activation element which is assigned to a flap operator control event is arranged in the passenger compartment of the vehicle, and/or in that an activation element which is assigned to a flap operator control event is arranged on a radio key.

5. The method as claimed in claim 1, wherein the suppression condition is that the first and successive second flap operator control events are substantially identical flap operator control events.

6. The method as claimed in claim 1, wherein the suppression condition is that the first and successive second flap operator control events are successive within a predetermined limiting time interval.

7. The method as claimed in claim 1, wherein the suppression condition is that the flap wing is in a predetermined adjustment range.

8. The method as claimed in claim 1, wherein the suppression condition is that the first flap operator control event triggers the starting of an opening process.

9. A flap arrangement of a motor vehicle, comprising:
a flap wing, a control arrangement, and a flap drive assigned to the flap wing, the flap drive configured to adjust the flap wing between a closed position and an open position; and wherein the control arrangement is configured to start, as a technical control reaction to a flap operator control event, a new adjustment process from a stationary state and/or is configured to continue a stopped adjustment process in an opposite adjustment direction;

wherein a stopping of an adjustment process is a technical control reaction to two successive flap operator control events; and wherein the control arrangement is configured to suppress the stopping of the adjustment process if the control arrangement detects at least one suppression condition.

10. The flap arrangement as claimed in claim 9, wherein the flap arrangement has a motor vehicle lock which in a latched state engages in a securing fashion with a closing wedge, and in a released state releases the closing wedge, and in that the motor vehicle lock is adjusted to the released state by means of the control arrangement before a motor-operated opening process is started.

11. The method as claimed in claim 5, wherein the first and successive second identical flap operator control events are assigned an activation element.

12. The method as claimed in claim 11, wherein the activation element is arranged on the flap wing.

13. The method as claimed in claim 12, wherein the activation element is arranged on the outside of the flap wing.

14. The method as claimed in claim 6, wherein the limiting time interval is less than 3 seconds.

15. The method as claimed in claim 6, wherein the limiting time interval is less than 1 second.

16. The method as claimed in claim 6, wherein the limiting time interval is less than 0.5 seconds.

17. The method as claimed in claim 7, wherein the flap wing is in a predetermined limiting adjustment range positioned before the closed position.

18. The method as claimed in claim 17, wherein the limiting adjustment range is defined by an adjustment travel of the flap wing, in particular a flap angle, by an adjustment travel of the flap drive or by an adjustment portion in relation to the respective overall adjustment travel.

\* \* \* \* \*